United States Patent
Noh et al.

(10) Patent No.: US 10,333,714 B2
(45) Date of Patent: Jun. 25, 2019

(54) METHOD AND APPARATUS FOR KEY GENERATION BASED ON FACE RECOGNITION USING CNN AND RNN

(71) Applicant: ELECTRONICS AND TELECOMMUNICATIONS RESEARCH INSTITUTE, Daejeon (KR)

(72) Inventors: Jong-Hyouk Noh, Daejeon (KR); Seok Hyun Kim, Daejeon (KR); Soo Hyung Kim, Daejeon (KR); Seung-Hyun Kim, Daejeon (KR); Youngsam Kim, Daejeon (KR); Sangrae Cho, Daejeon (KR); Young Seob Cho, Daejeon (KR); Jin-Man Cho, Daejeon (KR); Seyoung Huh, Daejeon (KR); Jung Yeon Hwang, Daejeon (KR); Seung Hun Jin, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 41 days.

(21) Appl. No.: 15/629,611

(22) Filed: Jun. 21, 2017

(65) Prior Publication Data

US 2018/0123797 A1 May 3, 2018

(30) Foreign Application Priority Data

Oct. 31, 2016 (KR) ........................ 10-2016-0143634

(51) Int. Cl.
*G06K 9/00* (2006.01)
*H04L 9/32* (2006.01)
*H04L 9/08* (2006.01)

(52) U.S. Cl.
CPC ........ *H04L 9/3231* (2013.01); *G06K 9/00228* (2013.01); *G06K 9/00288* (2013.01); *G06K 9/00885* (2013.01); *H04L 9/0863* (2013.01); *H04L 9/0866* (2013.01); *H04L 9/3247* (2013.01); *G06K 2009/00953* (2013.01)

(58) Field of Classification Search
None
See application file for complete search history.

(56) References Cited

U.S. PATENT DOCUMENTS

| | | |
|---|---|---|
| 2011/0142346 A1 | 6/2011 | Han et al. |
| 2014/0089236 A1 | 3/2014 | Lee et al. |

FOREIGN PATENT DOCUMENTS

| | | |
|---|---|---|
| JP | 2015-039106 A | 2/2015 |
| KR | 10-2006-0044801 A | 5/2006 |

OTHER PUBLICATIONS

Weiguo Sheng et al., "A Biometric Key Generation Method Based on Semisupervised Data Clustering", IEEE Transactions on Systems, MAN, and Cybernetics: Systems, Sep. 2015, pp. 1205-1217, vol. 45, No. 9, IEEE.

*Primary Examiner* — Mark Roz

(57) ABSTRACT

A face recognition based key generation apparatus controls a key generation model that is formed of a CNN and an RNN to be learned to generate a desired key having a consistent value by using sample facial images of a key owner and a PIN of the key owner as inputs, and the key generation model receives a facial image of the key owner and the PIN of the key owner, as inputs at a desired key generation time, and generates a key.

8 Claims, 5 Drawing Sheets

METHOD AND APPARATUS FOR KEY GENERATION BASED ON FACE RECOGNITION USING CNN AND RNN

CROSS-REFERENCE TO RELATED APPLICATION

This application claims priority to and the benefit of Korean Patent Application No. 10-2016-0143634 filed in the Korean Intellectual Property Office on Oct. 31, 2016, the entire contents of which are incorporated herein by reference.

BACKGROUND OF THE INVENTION (a) Field of the Invention

The present invention relates to a method for key generation based on face recognition using a convolutional neural network (CNN) and a recurrent neural network (RNN), and an apparatus using the same.

(b) Description of the Related Art

A private key used in a digital signature has to be kept private by a key owner. When the private key is stolen or exposed, the corresponding digital signature becomes useless.

As a method for protecting a private key, it may be encoded and stored or may be stored in a different security medium. However, the above-stated methods have risks because substantially no verification is involved in the encryption or in use of the security medium. Thus, the private key owner may ask another person to sign without signing directly themselves, and a person who steals information that only the private owner knows may arbitrarily perform the digital signature. Accordingly, when a private key is generated and managed by using a biometric feature of the owner, a safer environment can be implemented.

However, unlike a password, biometric information includes a noise and thus a consistent value cannot be provided, thereby causing a difficulty in identification, and once it is exposed, the biometric information cannot be changed, and accordingly an additional method for preventing the exposure of the biometric information is required.

SUMMARY OF THE INVENTION

The present invention has been made in an effort to provide a face recognition based key generation method that uses a CNN and an RNN for generation of a consistent key using biometric information, and an apparatus using the same.

According to an exemplary embodiment of the present invention, a face recognition based key generation method is provided. The face recognition based key generation method includes: learning a key generation model that is formed of a convolutional neural network (CNN) and a recurrent neural network (RNN) for outputting a consistent key value by using sample facial images of a key owner and a personal identification number (PIN) of the key owner as inputs; and outputting the key by receiving a facial image of the key owner and the PIN of the key owner at a desired key generation time, by the key generation model.

The learning the key generation model may include: outputting a feature value of the respective sample facial images, which are provided as inputs, from the CNN; and performing iterative learning to output the consistent key using the feature value of each sample facial image and the PIN as inputs, in the RNN.

The CNN may be learned to generate a feature value from each sample facial image.

The face recognition based key generation method may further include, when an error correcting code is included in the key output from the key generation model, correcting the output key value and eliminating the error correcting code.

According to another exemplary embodiment of the present invention, a face recognition based key generation apparatus is provided. The face recognition based key generation apparatus may include: a key generation model formed of a convolutional neural network (CNN) and a recurrent neural network (RNN), receiving a facial image of a key owner and a personal identification number (PIN) of the key owner, as inputs at a desired key generation time, and generating a key; and a processor that controls the key generation model to be learned to generate a desired key having a consistent value by using sample facial images of a key owner and a PIN of the key owner as inputs.

The CNN may be learned to output a feature value of each sample facial image using the respective sample facial images as inputs, and the RNN may be learned to output the key having the consistent value using the feature value of each sample facial image and the PIN.

The face recognition based key generation apparatus may further include a function block that corrects an error in a key value output from the key generation model and eliminates an error correcting code when the error correcting code is included in the key value.

The face recognition based key generation apparatus may further include an input/output interface that provides the facial images and the PIN input from the key owner to the key generation model and outputs a key generated by the key generation model.

According to yet another exemplary embodiment of the present invention, a face recognition based key generation method is provided. The face recognition based key generation method includes: learning a key generation model that is formed of a convolutional neural network (CNN) and a recurrent neural network (RNN) for outputting a consistent key value by using sample facial images of a key owner as inputs; and outputting the key by receiving a facial image of the key owner at a desired key generation time, by the key generation model.

DETAILED DESCRIPTION OF THE EMBODIMENTS

Figure 1:
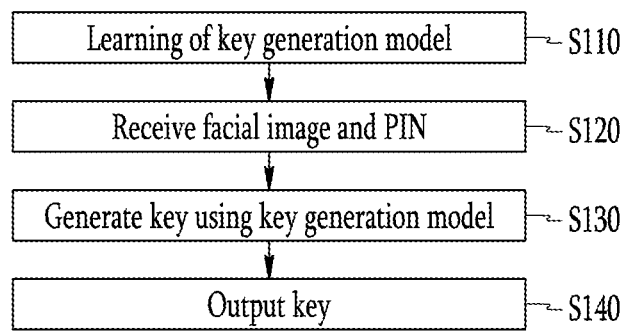
FIG. 1 is a flowchart of a method for key generation based on face recognition using a CNN and an RNN according to an exemplary embodiment of the present invention.

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

Hereinafter, a method for key generation based on face recognition using a convolutional neural network (CNN) and a recurrent neural network (RNN) according to an exemplary embodiment of the present invention, and an apparatus using the same, will be described with the accompanying drawings.

FIG. 1 is a flowchart of a face recognition based key generation method using a CNN and an RNN according to an exemplary embodiment of the present invention.

Referring to FIG. 1, a key generation model for learning-based key generation is learned (S110). The key generation model is formed of a CNN and an RNN.

The key generation model learns to output a consistent key value when receiving a sample facial image of each key owner and a personal information number (PIN), which is a secret key number of the key owner. That is, the key generation model is iteratively learned to output a consistent key even through various sample facial images of the key owner are input.

When receiving a facial image of the key owner and a PIN, which is a secret number kept secret by the key owner for key generation at a time of key generation (S120), the key generation model generates a key that corresponds to an output of the key generation model by using the received facial image and the PIN as inputs of the learned key generation model (S130).

The key generation model outputs the generated key (S140).

Figure 2:
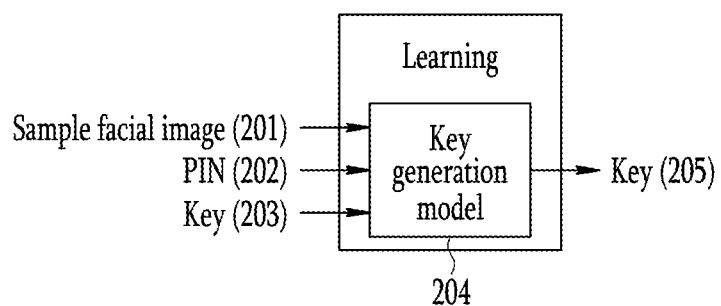
FIG. 2 is provided for description of a learning structure according to the exemplary embodiment of the present invention.

FIG. 2 is provided for description of a learning structure according to the exemplary embodiment of the present invention.

Referring to FIG. 2, a sample facial image 201 is a facial image of the key owner for learning, and is generated by a camera using optical technology, such as a smart phone, a web cam, and the like. Various sample facial images are used for the key generation model to learn to recognize the key owner in the learning structure.

A PIN 202 is a secret number of the key owner for key generation.

A key 203 is a value of a key to be generated with a sample facial image and a PIN. The key value is randomly generated and kept secret to prevent it from being exposed.

In the learning structure according to the exemplary embodiment of the present invention, the sample facial image 201, the PIN 202, and the key 203 are inputs, and a key 205 is an output. A key generation model 204 is repeatedly learned so that a value of an output key 205 that is the same as that of the input key 203 is generated. A plurality of sample facial images are provided as inputs, and the key generation model 204 is repeatedly learned to generate a consistent key 250 with respect to each of the plurality of sample facial images.

When a value of the key 205 that is output during the learning process is consistently the same as the value of the input key 203, the learning is terminated. The learned key generation model 204 is used in a key generation method.

The learning method shown in FIG. 2 may be performed by a processor (not shown). The processor may be a central processing unit (CPU), a graphics processing unit (GPU), or a dedicated processor that performs the methods according to exemplary embodiments of the present invention.

Figure 3:
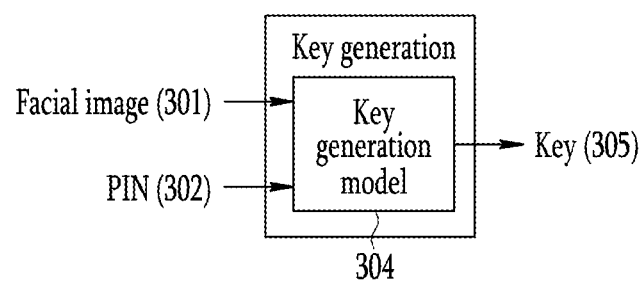
FIG. 3 is provided for description of a key generation structure according to the exemplary embodiment of the present invention.

FIG. 3 shows a key generation structure according to the exemplary embodiment of the present invention.

Referring to FIG. 3, a facial image 301, which is biometric information of a key owner, and a PIN 302 owned by the key owner for key generation are input to a key generation model 304. The facial image 301 is an image of the key owner, and is generated at the time of generation of the key.

The key generation model 304 is generated through the learning described with reference to FIG. 2. The key generation model 304 receives the facial image 301 and the PIN 302 of the key owner and generates a key 305, and outputs the generated key 305.

The key generation method described in FIG. 3 can be performed by a processor (not shown). The processor may be a CPU, a GPU, or a dedicated processor that performs the methods according to exemplary embodiments of the present invention.

Figure 4:
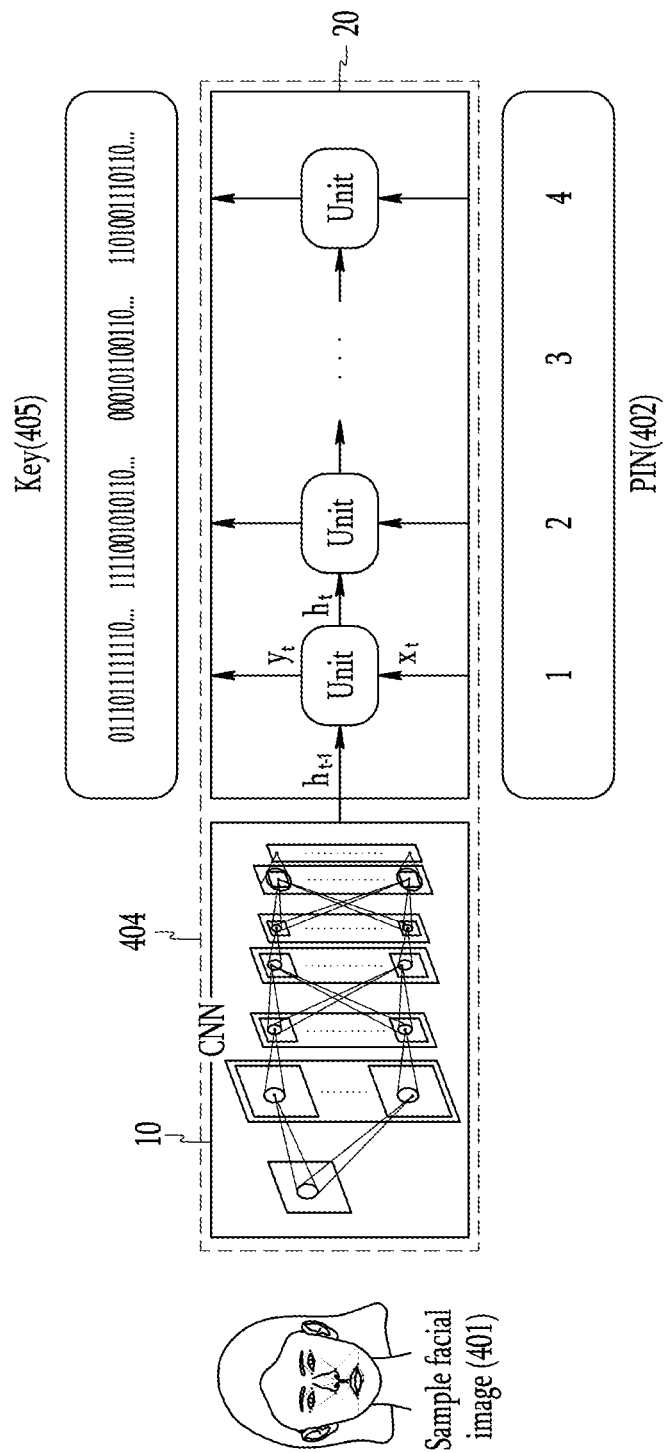
FIG. 4 shows a structure for learning a key generation model according to the exemplary embodiment of the present invention in detail.

FIG. 4 shows a structure for learning the key generation model according to the exemplary embodiment of the present invention in detail.

Referring to FIG. 4, a key generation model 404 is formed of a CNN 10 and an RNN 20.

A sample facial image 401 is an input of the CNN 10. The CNN 10 is a neural network model for extracting a feature value from a sample facial image.

The neural network model of the CNN 10 is pre-learned to identify a person from the sample facial image 401. That is, the CNN 10 has a function to identify each individual by learning facial images of many people before learning a key generation model. In addition, the CNN 10 is learned to extract a distinguishable feature value from a plurality of facial images of one person.

In particular, the neural network model of the CNN 10 is learned to generate a feature value from the sample facial image 401. The neural network model of the CNN 10 can be variously formed, and the exemplary embodiment of the present invention is not limited to the neural network model of the CNN 100.

In addition, the CNN 10 is not an object of learning when learning the key generation model.

The RNN 20 generates a key 405 by using the feature value of the sample facial image 401 that is output from the CNN 10 and the PIN 402. A connection between units that form an artificial neural network of the RNN 20 forms a directed cycle. An input value of the RNN 20 is the feature value of the sample facial image 410, which is a result of the CNN 10, and a PIN 402. The RNN 20 is iteratively learned for generation of a consistent value of the key 405 using a plurality of sample facial images 401 and the PIN 402 of the key owner during the learning process. That is, the RNN 20 is learned for generation of the same key 405 with respect to the plurality of sample facial images 401 of the key owner.

The RNN 20 iteratively uses a single unit. The number of repetitions of the units may be variously changed depending on a length of the PIN 402 and a length of the key 405.

Alternatively, the RNN 20 may hierarchically form a unit having a different format. Differing from the drawing, a portion that receives the PIN 402 and a portion that outputs the key 405 may be divided. The unit may be configured in a form that is independent of a length of the PIN 402 and a length of the key 405.

Meanwhile, although the key 405 is generated from the iterative learning, the generated key 405 may include a noise, and therefore an error correcting code may be included in a value of the key 405 in order to remove the noise of the key 405. The generated key 405 corrects an error by using the error correcting code.

In FIG. 3, when the error correcting code is included in the key 305 output from the key generation model 304, a process for eliminating the error correcting code is performed after the key generation process is performed. The elimination of the error correcting code may be performed by a function block (not shown) that is connected with the output of the key generation model 304.

The CNN 10 and the RNN 20 learned as described above are used as the key generation model 404.

The key generation model 404 learned through the above-stated process is used to generate a key at a desired key generation time. When a facial image 301 (refer to FIG. 3) is input to the CNN 10 of the key generation model 404 in the key generation process, a feature value is extracted from the CNN 10 of the key generation model 404, and a desired key 405 is output from the learned RNN 20 using the PIN 302 (refer to FIG. 2) input by the key owner and the feature value of the facial image 301 as inputs. In this case, the output key 405 corresponds to the key 305 of FIG. 3.

Figure 5:
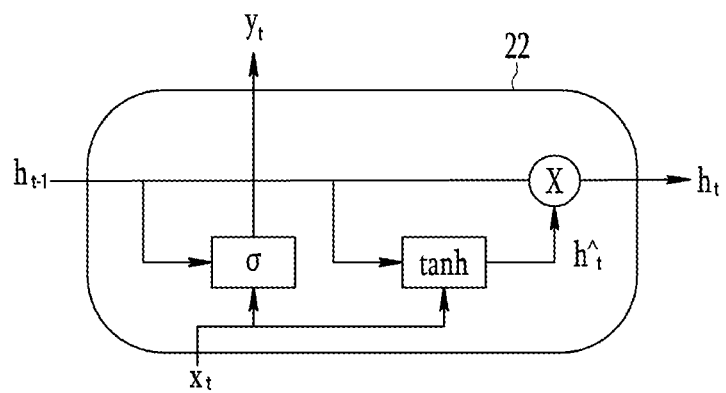
FIG. 5 shows an example of an RNN unit structure shown in FIG. 4.

FIG. 5 shows an exemplary unit structure of the RNN shown in FIG. 4. When the RNN iteratively uses one unit 22, only one unit 22 is as illustrated in FIG. 5.

Referring to FIG. 5, $h_{t-1}$ denotes an input value of the unit 22, and also denotes an output value of a previous unit 22 or a feature value of the facial image, which is a result of the CNN 10. That is, $h_{t-1}$ of the first unit 22 is a feature value of the facial image, which is a result of the CNN 10, and $h_{t-1}$ of the last unit 22 from the second unit 22 is an output value of a previous unit 22.

$x_t$ denotes a manipulated value of the PIN. $y_t$ denotes an output value of the unit 22, and is a part of the key.

$h_t$ denotes an output value of the unit 22 and is used as an input value of the next unit 22.

A logic operation structure in the unit 22 shown in FIG. 5 is set as given in Equation 1, and such a logic operation structure can be variously modified.

$$h_t = f_w(h_{t-1}, x_t)$$
$$h\hat{}_t = \tan h(W_h[h_{t-1}, x_t] + b_h)$$
$$h_t = h_{t-1} \times h\hat{}_t$$
$$y_t = \sigma(W_y[h_{t-1}, x_t] + b_y)$$

[Equation 1]

Each unit 22 of the RNN 20 performs a logic operation such as Equation 1 with respect to input values and then outputs a result.

Figure 6:
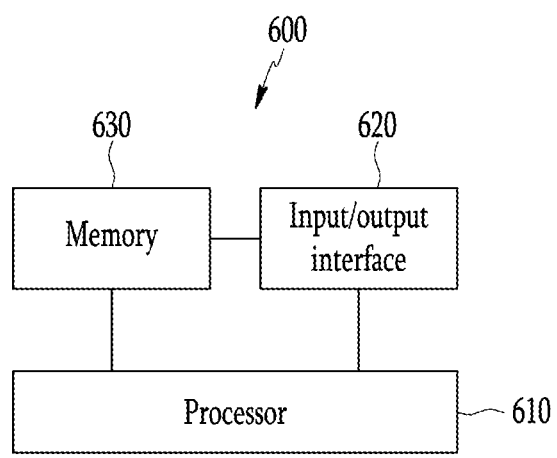
FIG. 6 shows a face recognition-based key generation apparatus using a CNN and an RNN according to an exemplary embodiment of the present invention.

FIG. 6 shows a face recognition-based key generation apparatus using a CNN and an RNN according to an exemplary embodiment of the present invention.

Referring to FIG. 6, a face recognition-based key generation apparatus 600 using a CNN and an RNN includes at least one processor 610, an input/output interface 620, and a memory 630.

The at least one processor 610 controls the key generation model to be learned based on FIG. 1 to FIG. 5, and generates a key by receiving a facial image and a PIN from a key owner at a desired key generation time by using the learned key generation model. In this case, a learning function of the key generation model and a key generation function using the key generation model may be respectively performed by different processors.

The input/output interface 620 is connected with the at least one processor 610, receives input values from the key owner, and outputs a key generated by the learned key generation model. For example, the facial image of the key owner and the PIN are input through the input/output interface 620, and then the input facial image or the input PIN is transmitted to the processor 610. The key generated by the processor 610 is output through the input/output interface 620.

The memory 630 may store instructions to be performed by the processor 610 or loads instructions from a storage device (not shown) and temporally stores the loaded instructions, and the processor 610 performs the instructions stored in the memory 630 or the loaded instructions. In addition, the memory 630 stores the learned key generation model.

According to the exemplary embodiments of the present invention, a consistent key can be generated by using a facial image of a key owner, which is biometric information, and accordingly, only the key owner is allowed to perform a digital signature. In addition, since the facial image and the PIN are used together, a key cannot be generated if any one of the two pieces of information is lacking, thereby providing safe authentication. Further, key update can be freely performed because of a learning-based key generation method.

Meanwhile, the exemplary embodiments of the present is described as learning the key generation model and generating a key, using a PIN and facial images, but may learn the key generation model and generate the key, using only facial images.

The foregoing exemplary embodiments of the present invention are not implemented only by an apparatus and a method, and therefore may be realized by programs realizing functions corresponding to the configurations of the exemplary embodiments of the present invention or recording media on which the programs are recorded.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A face recognition based key generation method comprising:
   learning a key generation model that is formed of a convolutional neural network (CNN) and a recurrent neural network (RNN) for outputting a consistent key value by using sample facial images of a key owner and a personal identification number (PIN) of the key owner as inputs; and
   generating a key by receiving a facial image of the key owner and the PIN of the key owner at a desired key generation time, by the key generation model,
   wherein the key is for performing a digital signature, and
   wherein the learning the key generation model comprises:
   outputting a feature value of the respective sample facial images, which are provided as inputs, from the CNN, and
   performing iterative learning to output the consistent key using the feature value of each sample facial image and the PIN as inputs, in the RNN.

2. The face recognition based key generation method of claim 1, wherein the CNN is learned to generate a feature value from each sample facial image.

3. The face recognition based key generation method of claim 1, further comprising, when an error correcting code is included in the key output from the key generation model, correcting the output key value and eliminating the error correcting code.

4. A face recognition based key generation apparatus comprising:
  a key generation model formed of a convolutional neural network (CNN) and a recurrent neural network (RNN), the key generation model receiving a facial image of a key owner and a personal identification number (PIN) of the key owner, as inputs at a desired key generation time, and generating a key; and
  a processor that controls the key generation model to be learned to generate a desired key having a consistent value by using sample facial images of a key owner and a PIN of the key owner as inputs,
  wherein the key is for performing a digital signature, and
  wherein the learning the key generation model comprises:
    outputting a feature value of the respective sample facial images, which are provided as inputs, from the CNN, and
    performing iterative learning to output the consistent key using the feature value of each sample facial image and the PIN as inputs, in the RNN.

5. The face recognition based key generation apparatus of claim 4, further comprising a function block that corrects an error in a key value output from the key generation model and eliminates an error correcting code when the error correcting code is included in the key value.

6. The face recognition based key generation apparatus of claim 4, further comprising an input/output interface that provides the facial images and the PIN input from the key owner to the key generation model.

7. A face recognition based key generation method comprising:
  learning a key generation model that is formed of a convolutional neural network (CNN) and a recurrent neural network (RNN) for outputting a consistent key value by using sample facial images of a key owner as inputs, learning the key generation model including:
    outputting a feature value of the respective sample facial images, which are provided as inputs, from the CNN, and
    performing iterative learning to output the consistent key using the feature value of each sample facial image and a personal identification number (PIN) as inputs, in the RNN; and
  generating, using the key generation model, a key by receiving a facial image of the key owner at a desired key generation time,
  wherein the key is for performing a digital signature.

8. The face recognition based key generation method of claim 7, further comprising, when an error correcting code is included in the key output from the key generation model, correcting the output key value and eliminating the error correcting code.

* * * * *